US006254230B1

(12) United States Patent
Wen et al.

(10) Patent No.: US 6,254,230 B1
(45) Date of Patent: Jul. 3, 2001

(54) INK JET PRINTING APPARATUS WITH PRINT HEAD FOR IMPROVED IMAGE DURABILITY

(75) Inventors: Xin Wen; David Erdtmann; Charles E. Romano; Thomas W. Martin, all of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 33 days.

(21) Appl. No.: 09/083,876

(22) Filed: May 22, 1998

(51) Int. Cl.[7] ..................... G01D 15/18
(52) U.S. Cl. ..................... 347/101; 347/96
(58) Field of Search ..................... 347/1, 101, 102, 347/105, 106, 95, 96, 98; 118/400; 427/337

(56) References Cited

U.S. PATENT DOCUMENTS

| | | | | |
|---|---|---|---|---|
| 2,059,817 | | 11/1936 | Sheppard et al. . | |
| 2,992,109 | | 7/1961 | Allen . | |
| 2,994,611 | | 8/1961 | Heyna et al. . | |
| 3,232,763 | | 2/1966 | Burness et al. . | |
| 3,304,179 | | 2/1967 | Field et al. . | |
| 3,360,372 | | 12/1967 | Burness et al. . | |
| 3,490,911 | | 1/1970 | Burness et al. . | |
| 3,565,632 | | 2/1971 | Mills et al. . | |
| 3,635,718 | | 1/1972 | Froehlich et al. . | |
| 3,640,720 | | 2/1972 | Cohen . | |
| 3,642,486 | | 2/1972 | Burness et al. . | |
| 3,689,274 | | 9/1972 | Sobel et al. . | |
| 3,762,926 | | 10/1973 | Himmelmann et al. . | |
| 4,538,160 | | 8/1985 | Uchiyama . | |
| 4,597,794 | | 7/1986 | Ohta et al. . | |
| 5,085,698 | | 2/1992 | Ma et al. . | |
| 5,141,599 | * | 8/1992 | John et al. | 162/137 |
| 5,172,133 | | 12/1992 | Suga et al. . | |
| 5,294,946 | * | 3/1994 | Gandy et al. | 346/140 |
| 5,598,196 | | 1/1997 | Braun . | |
| 5,605,750 | | 2/1997 | Romano et al. . | |
| 5,611,847 | | 3/1997 | Guistina et al. . | |
| 5,635,969 | | 6/1997 | Allen . | |
| 5,679,139 | | 10/1997 | McInerney et al. . | |
| 5,679,141 | | 10/1997 | McInerney et al. . | |
| 5,679,142 | | 10/1997 | McInerney et al. . | |
| 5,698,018 | | 12/1997 | Bishop et al. . | |
| 5,853,470 | * | 12/1998 | Martin et al. | 106/31.86 |
| 5,891,553 | * | 4/1999 | Hendrix et al. | 428/200 |

FOREIGN PATENT DOCUMENTS 726 148 A2 8/1996 (EP) .

OTHER PUBLICATIONS

The Theory of the Photographic Process, 4th Edition, T.H. James, 1977. McMillan Publishing Co., pp. 77–87.

Research Disclosure, vol. 365, Sep. 1994, Item 36544, II B. Hardeners.

* cited by examiner

*Primary Examiner*—Robert Beatty
(74) *Attorney, Agent, or Firm*—Doreen M. Wells

(57) ABSTRACT

An ink jet printing apparatus for producing an image on a gelatin coated ink receiver includes, at least one ink reservoir for providing ink for printing the image; a first print head coupled to an ink receiver and at least one ink reservoir, for producing disposing ink spots on the ink receiver; a hardening fluid reservoir for providing a hardening fluid for treating the ink spots disposed on the receiver; and a second print head coupled to the ink receiver and the fluid reservoir, for depositing the fluid on the ink spots disposed on the ink receiver whereby the gelatin coating is cross-linked with the hardening fluid thus improving the image stability and durability of the image.

17 Claims, 2 Drawing Sheets

INK JET PRINTING APPARATUS WITH PRINT HEAD FOR IMPROVED IMAGE DURABILITY

CROSS REFERENCE TO RELATED APPLICATIONS

The present invention is related to commonly assigned, concurrently filed:

(1) U.S. patent application Ser. No. 09/083,673, filed May 22, 1998, entitled "APPARATUS WITH SPRAY BAR FOR IMPROVED DURABILITY" of Wen et al., (2) U.S. patent application Ser. No. 09/083,870, filed May 22, 1998, entitled "PRINTING APPARATUS WITH PROCESSING TANK" of Wen et al., (3) U.S. patent application Ser. No. 09/083,605, filed May 22, 1998, entitled "PIGMENTED INK JET PRINTS OVERCOATED WITH HARDENERS" of Erdtmann et al., (4) U.S. patent application Ser. No. 09/083,875, filed May 22, 1998, entitled "INKJET IMAGES ON PVA OVERCOATED WITH HARDENER SOLUTION" of Erdtmann et al., (5) U.S. patent application Ser. No. 09/083,871, filed May 22, 1998, entitled "WATERFAST INK JET IMAGES TREATED WITH HARDNERS" of Erdtmann et al.

The disclosures of these related applications are incorporated herein by reference.

FIELD OF THE INVENTION

This invention relates to an ink jet apparatus and to a method of improving the image stability of the prints provided by ink jet printing.

BACKGROUND OF THE INVENTION

In the field of ink jet printing, there have existed long felt needs for making images waterfast and also durable against physical abrasion. One method practiced in the art is to laminate a clear film on the printed image after the image has been printed on a receiver. However, such a lamination method is time consuming and often produces undesirable waste due to print handling and unusable prints caused by the air bubbles trapped between the lamination sheet and the ink receiver. The lamination method also increases media and equipment costs because of the additional sheet and apparatus involved.

U.S. Pat. No. 5,635,969 discloses an ink jet printer that includes a print head for depositing an ink precursor on the ink recording medium. The ink precursor conditions the ink recording medium before colored ink spots are placed on the conditioned areas. The preconditioning of the recording medium can be used for reducing paper cockle and color bleed, for decreasing dry time, and for improving dot shape.

SUMMARY OF THE INVENTION

It is an object of the present invention to provide an ink jet apparatus that produces prints with improved image stability and durability. It is a further object of the present invention to provide such an ink jet apparatus that is simple and inexpensive. It is a further object of the present invention to provide such an ink jet apparatus that operates in a time- and energy-efficient manner.

These objects are achieved by an ink jet printing apparatus for producing an image on an ink receiver, comprising: at least one ink reservoir for providing ink for printing the image; a first print head means coupled to an ink receiver and at least one ink reservoir, for producing disposing ink spots on the ink receiver; a fluid reservoir for providing a fluid for treating the ink spots disposed on the receiver; and a second print head means coupled to the ink receiver and the fluid reservoir, for depositing the fluid on the ink spots disposed on the ink receiver thereby improving the image quality, stability and durability of the image.

Images produced by the apparatus and method of the invention are waterfast and have good wet adhesion.

DETAILED DESCRIPTION OF THE INVENTION

The present invention is described with relation to an apparatus that is capable of producing an ink jet print and providing a protection fluid on the print.

Figure 1:
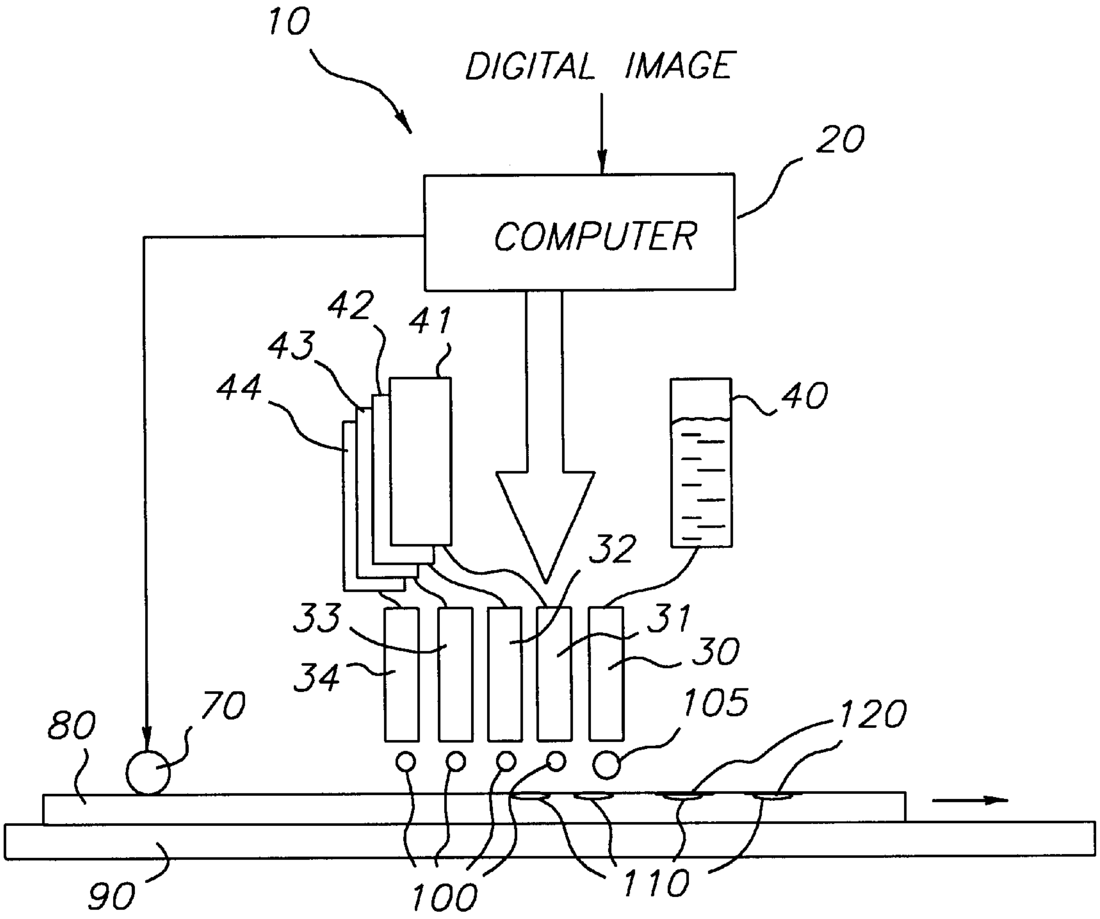
FIG. 1 is a schematic diagram of a side view of a printing apparatus in accordance with the present invention showing the printing of an ink jet image.

Referring to FIG. 1, a ink jet printing apparatus 10 is shown to comprise a computer 20, ink jet print heads 31–34, a fluid reservoir 40, ink reservoirs 41–44, a receiver transport 70, and a platen 90. An ink receiver 80 is supported by a platen 90. The computer 20 can include a microprocessor, a monitor, and a user interface. A digital image is stored in the memory of the computer 20. Also stored within the memory of the computer are image processing programs such as halftoning algorithms, which are well known in the art. In the present invention, the ink jet printing apparatus 10 can be a drop-on-demand ink jet printer that selectively activates the ink jet print heads to transfer ink drops 100 to form ink spots 110 in an imagewise pattern on the receiver 80 according to the digital image in the computer. The ink jet printing apparatus 10 can also be a continuous ink jet printer as is also well known in the art. The ink jet print heads 31–34 can comprise one or a plurality of ink nozzles. The ink jet print heads 31–34 can exist in different forms, for example, a drop on demand or continuous inkjet as provided by piezo-electric or thermal ink jet print heads, respectively. Preferably, the print head is valveless, such as for example, the piezoelectric ink jet print head shown in commonly assigned U.S. Pat. No. 5,598,196. Print head 30, labeled P, contains a protection fluid which is preferably colorless. Print head 30 is also valveless and is preferably of the same type as the print heads 31–34. The print head 30 is either a drop-on-demand or a continuous ink jet printer, again an example of such a valveless print head is the piezoelectric print head of U.S. Pat. No. 5,598,196. Details of protection fluids will be described below. Ink jet print heads 31–34 are labeled respectively: K for black ink; C for cyan ink; M for magenta ink; and Y for yellow ink. The print head 30 for transferring the protection fluid from reservoir 40 is an integral of the ink jet printing apparatus 10. This minimizes the equipment cost and energy usage compared to the prior art lamination technique.

The ink reservoirs 41–44 respectively contain black, cyan, magenta, and yellow inks that are supplied to the ink jet print heads 31–34 of the corresponding colors. Although not shown in FIG. 1, the ink jet printing apparatus 10 can also include inks of other colors such as red, green, blue, etc. Several ink densities can also be used for each color. The colorants in the inks can be dyes or pigments.

The ink receiver 80 can be common paper having sufficient fibers to provide a capillary force to draw the ink from the mixing chambers into the paper. Synthetic papers can also be used. The receiver 80 can comprise a layer that is porous to the inks, an ink absorbing layer, as well as materials with a strong affinity and mordanting effect for the inks. Exemplary receivers are disclosed in U.S. Pat. No. 5,605,750. The ink receiver 80 is supported by the platen 90. The platen 90 can exist in many forms such as a flat platen surface as shown in FIG. 1, or an external or internal drum surface.

Figure 2:
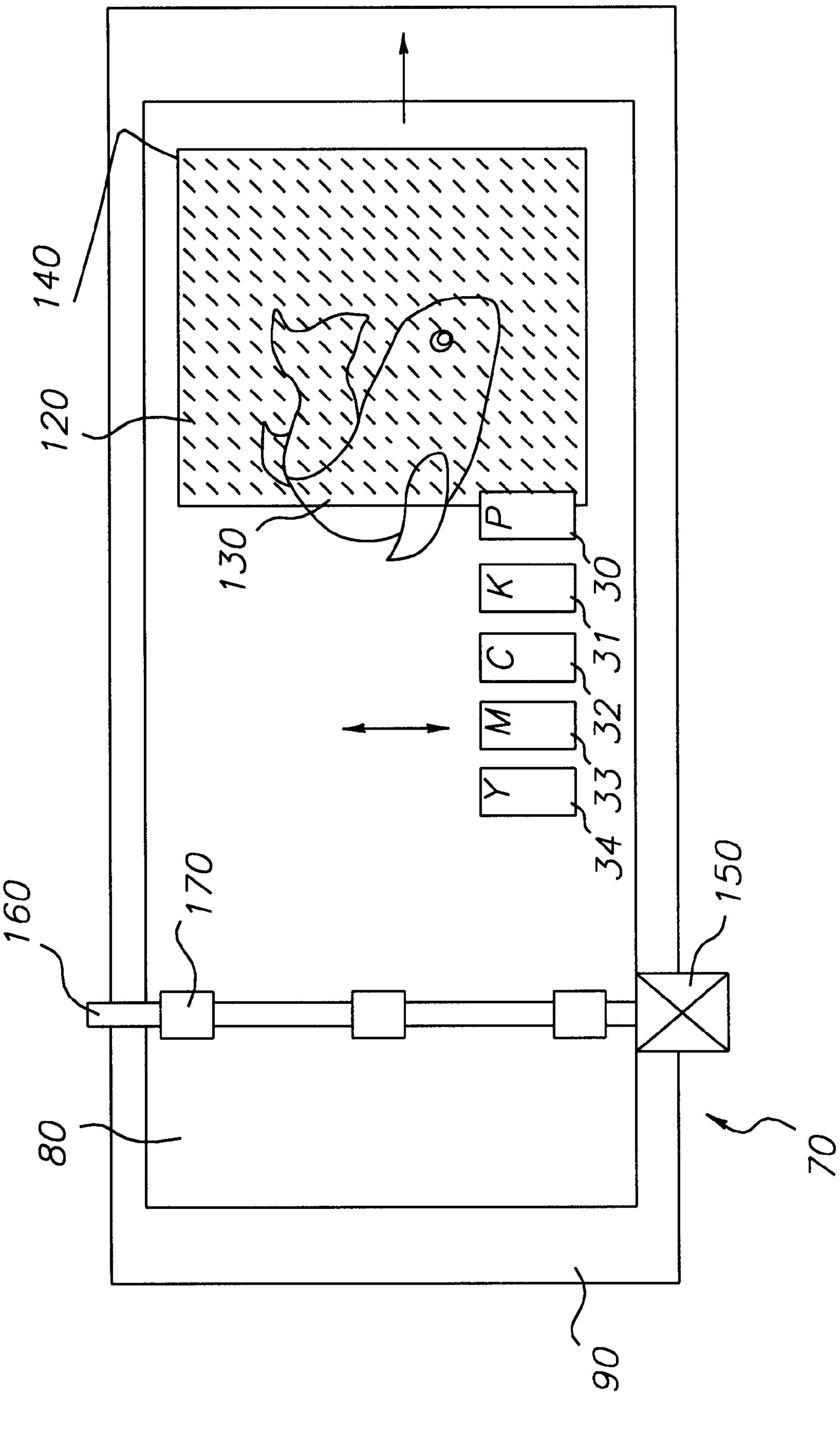
FIG. 2 is a top view of the ink jet printing apparatus of FIG. 1.

FIG. 2 illustrates a top view of the ink jet printing apparatus 10 in accordance with the present invention. The ink receiver 80 is transported by the receiver transport 70 on the platen 90 in a direction as indicated by an arrow. The receiver transport 70 is shown to include a motor 150 that drives a shaft 160 and rollers 170. A plurality of rollers 170 are shown for evenly applying forces across the receiver 80. The rollers are typically provided with a layer of elastomer material such as polyurethane or silicon rubber for providing sufficient friction between the roller surface and the receiver 80. The print heads 30–34 are shown to move across the receiver 80 in the direction as indicated by the arrow. For clarity reasons, the transport mechanism for the print heads are not shown in FIG. 2. A printed image 130 is shown, which is formed by the ink spots 110 as shown in FIG. 1. The print head 30 transfers the protection fluid from the reservoir 40 onto the receiver 80 after the image is printed. The area on the receiver 80 which received the protection fluid is indicated by the treated image area 140 which includes a plurality of fluid spots 120. An image can be printed in one or any number of printing passes; however, to avoid excessive ink on the receiver 80, a multiple number of printing passes might be preferred. Likewise, the protection fluid 105 is deposited on the ink spots 110 simultaneously with or after the final printing pass. Optionally, the fluid 105 can be deposited after or simultaneously with any one of the multiple printing passes. The fluid 105 can also be deposited in multiple passes following deposit of the last ink drop.

A typical printing operation is now described. A digital image is input to the computer 20. Alternatively, the computer 20 can produce this digital image itself. The image is then processed by algorithms well known in the art for best color and tone reproduction of the input image. During printing, the ink receiver 80 is transported by the receiver transport 70 under the control of the computer 20 in the direction as indicated by the arrow in FIG. 1. The print heads can also be transported relative to the ink receiver during printing. The computer 20 controls the print heads 31–34 according to the input digital image to eject ink drops 100 to form ink spots 110 on the receiver 80.

After the ink spots 110 are placed on the receiver 80, the print head 30 ejects fluid drop 105 to form fluid spot 120 over the ink spots 110. As described below, the fluid can include a hardener solution. The hardener solution hardens the ink spot 110 on the ink receiver 80 and improves waterfastness and physical durability i.e., abrasion resistance of the printed image. The fluid spot 120 by print head 30 can be disposed during the printing passes while the ink drops 100 are deposited on the receiver 80. Thus, no additional time is required. This is advantageous compared to the lamination technique in the prior art in which one or more separate lamination steps are added for the image protection. Alternatively, the fluid drops 105 can also be placed in a separate pass after the placement of ink spots 110. Another advantage is that the protection fluid can be disposed on the printed areas only; this way the material usage is much lower than in prior art lamination technique in which a sheet material is laminated over the whole area of receiver 80.

Inks suitable for the present invention are now described. Inks useful for ink jet recording processes generally comprise at least a mixture of a solvent and a colorant. The preferred solvent is de-ionized water, and the colorant is either a pigment or a dye. Pigments are often preferred over dyes because they generally offer improved waterfastness and lightfastness.

Pigmented inks are most commonly prepared in two steps:

1. a pigment milling step in which the as-received pigment is deaggregated into its primary particle size, and
2. a dilution step in which the pigment mill grind is converted into the ink formulation described below.

Processes for preparing pigmented ink jet inks involve blending the pigment, an additive known as a stabilizer or dispersant, a liquid carrier medium, grinding media, and other optional addenda such as surfactants and defoamers. This pigment slurry is then milled using any of a variety of hardware such as ball mills, media mills, high-speed dispersers, or roll mills.

In the practice of the present invention, any of the known pigments can be used. The exact choice of pigment will depend upon the specific color reproduction and image stability requirements of the printer and application. For a list of pigments useful in ink jet inks, see U.S. Pat. No. 5,085,698, column 7, line 10 through column 8, line 48.

The liquid carrier medium can also vary widely and again will depend on the nature of the ink jet printer for which the inks are intended. For printers which use aqueous inks, water, or a mixture of water with miscible organic co-solvents, is the preferred carrier medium.

The dispersant is another important ingredient in the mill grind. Although there are many dispersants known in the art, the choice of the most suitable dispersant will often be a function of the carrier medium and the type of pigment being used. Preferred dispersants for aqueous ink jet inks include sodium dodecyl sulfate, acrylic and styrene-acrylic copolymers, such as those disclosed in U.S. Pat. Nos. 5,085,698 and 5,172,133, and sulfonated styrenics, such as those disclosed in U.S. Pat. No. 4,597,794. Most preferred dispersants are salts of oleyl methyl tauride.

In the dilution step, other ingredients are also commonly added to the formulation for pigmented ink jet inks. Cosolvents (0–20 wt %) are added to help prevent the ink from drying out or crusting in the orifices of the printhead or to help the ink penetrate the receiving substrate, especially when the substrate is a porous paper. Preferred cosolvents for the inks of the present invention are glycerol, ethylene glycol, propylene glycol, 2-methyl-2,4,-pentanediol, diethylene glycol, and mixtures thereof, at overall concentrations ranging from 5 to 20 wt %.

A biocide (0.0001–1.0 wt %) can be added to prevent unwanted microbial growth which may occur in the ink over time. A preferred biocide for the inks of the present invention is Proxel GXL™ (1,2-benzisothiozolin-3-one, obtained from Zeneca Colours) at a final concentration of 0.005–0.5 wt %.

Other optional additives which may be present in ink jet inks include thickeners, conductivity enhancing agents, anti-kogation agents, drying agents, and defoamers.

In the present invention, the protection fluid as described above can include an aqueous solution. The aqueous solution can comprise one or more cosolvents, a surfactant, and a compound containing a hardening agent such as an aldehyde, a blocked aldehyde, (DHD), an active olefin or a blocked active olefin and the like would be applied to the ink image on receiver 80 by print head 30 as described above.

Hardeners are defined as any additive which causes chemical cross-linking. Blocked hardeners are substances, usually derived from the active hardener, that release the active compound under appropriate conditions (The Theory of the Photographic Process, 4th Edition, T. H. James, 1977, Macmillan Publishing CO., page 81). In the present invention, the protection fluid is also referred to as overcoat additives (see Table 1).

It is contemplated that other hardening agents may be useful in the instant invention. Some compounds known to be effective hardening agents are blocked aldehydes such as 2,3-dihydroxy-1,4-dioxane (DHD) and its derivatives, acetates of the dialdehydes and hemiacetals, various bisulfite adducts, and 2,5-dimethoxytetrahydrofuran. Aldehyde containing compounds that are effective hardening agents are also useful in the practice of this invention. Some compounds known to be effective hardening agents are 3-hydroxybutyraldehyde (U.S. Pat. No. 2,059,817), crotonaldehyde, the homologous series of dialdehydes ranging from glyoxal to adipaldehyde, diglycolaldehyde (U.S. Pat. No. 3,304,179) and various aromatic dialdehydes (U.S. Pat. Nos. 3,565,632 and 3,762,926). Active olefin containing compounds that are effective hardening agents are also useful in the practice of this invention. In the context of the present invention, active olefinic compounds are defined as compounds having two or more olefinic bonds, especially unsubstituted vinyl groups, activated by adjacent electron withdrawing groups (The Theory of the Photographic Process, 4th Edition, T. H. James, 1977, Macmillan Publishing Co., page 82). Some compounds known to be effective hardening agents are divinyl ketone, resorcinol bis (vinylsulfonate) (U.S. Pat. No. 3,689,274), 4,6-bis (vinylsulfonyl)-m-xylene (U.S. Pat. No. 2.994,611), bis (vinylsulfonylalkyl) ethers and amines (U.S. Pat. Nos. 3,642,486 and 3,490,911), 1,3,5-tris(vinylsulfonyl) hexahydro-s-triazine, diacrylamide (U.S. Pat. No. 3,635,718), 1,3-bis(acryloyl)urea (U.S. Pat. No. 3,640,720), N,N'-bismaleimides (U.S. Pat. No. 2,992,109) bisisomaleimides (U.S. Pat. No. 3,232,763) and bis(2-acetoxyethyl) ketone (U.S. Pat. No. 3,360,372). Blocked active olefins of the type bis(2-acetoxyethyl) ketone and 3,8-dioxodecane-1,10-bis (pyridinium perchlorate), may also be used. (*The Theory of the Photographic Process*, 4th Edition, T. H. James, 1977, Macmillan Publishing CO.) Additional related hardening agents can be found in *Research Disclosure*, Vol. 365, September 1994, Item 36544, II, B. Hardeners.

Still other preferred additives are inorganic hardeners such as aluminum salts, especially the sulfate, potassium and ammonium alums, ammonium zirconium carbonate, chromium salts such as chromium sulfate and chromium alum, and salts of titanium dioxide, zirconium dioxide, and the like. All are employed at concentrations ranging from 0.10 to 5.0 weight percent of active ingredients in the solution.

Combinations of organic and inorganic hardeners may also be used. Most preferred is the combination of chrome alum (chromium (III) potassium sulfate dodecahydrate) or aluminum sulfate and 2,3-dihydroxy-1,4-dioxane (DHD) at total hardener concentrations ranging from 0.10 to 5.0 wt. Most preferred is the combination of aluminum sulfate and 2,3-dihydroxy-1,4-dioxane (DHD) having a total hardener concentration ranging between 0.25 and 2.0 weight percent of active ingredients in the hardener solution.

It has been unexpectedly found that improved waterfastness, and excellent wet adhesion properties on gelatin coatings can be achieved when pigmented ink images printed on said coatings are overcoated with a solution containing hardeners such as aldehydes, blocked aldehydes, active olefins and blocked active olefins. Most preferred are glyoxal, DHD, and formaldehyde, all at concentrations ranging from about 0.10 to 5.0 wt %.

The present invention is better illustrated by the following examples:

Comparative Example A. (w/o hardener)

| Mill Grind | |
|---|---|
| Polymeric beads, mean diameter of 50 μm (milling media) | 325.0 g |
| Bis(phthalocyanylalumino)tetra-Phenyldisiloxane (cyan pigment) Manufactured by Eastman Kodak | 35.0 g |
| Oleoyl methyl taurine, (OMT) sodium salt | 17.5 g |
| Deionized water | 197.5 g |
| Proxel GXL ™ (biocide from Zeneca) | 0.2 g |

The above components were milled using a high energy media mill manufactured by Morehouse-Cowles Hochmeyer. The mill was run for 8 hours at room temperature. An aliquot of the above dispersion to yield 1.0 g pigment was mixed with 8.0 g diethylene glycol, and additional deionized water for a total of 50.0 g. This ink was filtered through 3-μm filter and introduced into an empty Hewlett-Packard 51626A print cartridge. Images were made with a Hewlett-Packard DeskJet™ 540 printer on medium weight resin coated paper containing an imaging layer.

The resin coated paper stock had been previously treated with a corona discharge treatment (CDT) and coated with an imaging layer consisting of about 800 mg/ft$^2$ of gelatin. Poor waterfastness and wet adhesion was observed in the $D_{max}$ areas. In the low density patches (about 0.50), and with narrow lines (~1/32nd of an inch) the pigmented ink image floated to the surface immediately when immersed in distilled water.

Comparative Example B (w/o hardener)

An ink was prepared in a similar manner as described in Comparative Example A. except, the cyan pigment was replaced with 1.45 g of a quinacridone magenta pigment (red pigment 122) from Sun Chemical Co. The ink was printed as in Comparative Example A and poor waterfastness and wet adhesion were observed.

EXAMPLE 1

An ink was prepared in the same manner as that described in Comparative Example A. This ink was printed on resin coated paper stock which had been previously treated with a corona discharge treatment(CDT) and coated with an imaging layer consisting of about 800 mg/ft$^2$ of gelatin.

An overcoat solution was prepared consisting of 8.0 g of diethylene glycol, 5.00 g of a 10.0% solution of Air Products Surfynol® 465, 2.03 g of 37 wt % solution of formaldehyde obtained from Aldrich Chemicals to obtain a final concentration of 1.50 wt %, and additional deionized water for a total of 50.0 g. The overcoat solution was introduced into an empty Hewlett-Packard 51626A print cartridge. This solution was overcoated at 100% coverage onto the above pigmented ink image. Excellent waterfastness and wet adhesion was observed in the 100% fill areas ($D_{max}$). Excellent waterfastness and wet adhesion properties were also observed at lower density patches, and with thin narrow lines (~1/32nd of an inch).

EXAMPLE 2

An ink was prepared in the same manner as that described in Comparative Ex. B. This ink was printed on resin coated paper stock which had been previously treated with a corona discharge treatment(CDT) and coated with an imaging layer consisting of about 800 mg/ft$^2$ of gelatin.

An overcoat solution was prepared consisting of 8.0 g of diethylene glycol, 5.00 g of a 10.0% solution of Air Products Surfynol® 465, 2.03 g of 37 wt % solution of formaldehyde obtained from Aldrich Chemicals to obtain a final concentration of 1.50 wt %, and additional deionized water for a total of 50.0 g. The overcoat solution was introduced into an empty Hewlett-Packard 51626A print cartridge. This solution was overcoated at 100% coverage onto the above pigmented ink image. Excellent waterfastness and wet adhesion was observed in the 100% fill areas ($D_{max}$). Excellent waterfastness and wet adhesion properties was also observed at lower density patches, and with thin narrow lines (~1/32$^{nd}$ of an inch).

EXAMPLE 3

An ink was prepared in the same manner as that described in Comparative Ex. A. This ink was printed on resin coated paper stock which had been previously treated with a corona discharge treatment (CDT) and coated with an imaging layer consisting of about 800 mg/ft$^2$ of gelatin.

An overcoat solution was prepared consisting of 8.0 g of diethylene glycol, 5.00 g of a 10.0% solution of Air Products Surfynol® 465, 1.25 g of 40 wt % solution of glyoxal obtained from Aldrich Chemicals to obtain a final concentration of 1.0 wt %, and additional deionized water for a total of 50.0 g. This solution was overcoated onto the above pigmented ink image, in a manner similar to the above examples. Good waterfastness and very good wet adhesion were observed in the 100% fill areas ($D_{max}$). Excellent waterfastness and wet adhesion properties were also observed in lower density patches, and with thin narrow lines (~1/32$^{nd}$ of an inch).

EXAMPLE 4

An ink was prepared in the same manner as that described in Comparative Example B. This ink was printed on resin coated paper stock which had been previously treated with a corona discharge treatment(CDT) and coated with an imaging layer consisting of about 800 mg/ft$^2$ of gelatin.

An overcoat solution was prepared consisting of 8.0 g of diethylene glycol, 5.00 g of a 10.0% solution of Air Products Surfynol® 465, 1.25 g of 40 wt % solution of glyoxal obtained from Aldrich Chemicals to obtain a final concentration of 1.0 wt %, and additional deionized water for a total of 50.0 g. This solution was overcoated onto the above pigmented ink image. Excellent waterfastness and very good wet adhesion was observed in the 100% fill areas ($D_{max}$). Excellent waterfastness and wet adhesion properties was also observed at lower density patches, and with thin narrow lines (~1/32$^{nd}$ of an inch).

EXAMPLE 5

An ink was prepared and printed in the same manner as that described in Comparative Example A.

An overcoat solution was prepared consisting of 8.0 g of diethylene glycol, 5.00 g of a 10.0% solution of Air Products Surfynol® 465, 5.00 g of 10 wt % solution of 2,3-dihydroxy-1,4-dioxane (DHD) obtained from Aldrich to obtain a final hardener concentration of 1.00 wt %, and additional deionized water for a total of 50.0 g. This solution was overcoated onto the above pigmented ink image. Very good waterfastness and good wet adhesion was observed in the 100% fill areas ($D_{max}$). Excellent waterfastness and wet adhesion properties was also observed at lower density patches, and with thin narrow lines (~1/32$^{nd}$ of an inch).

EXAMPLE 6

An ink was prepared and printed in the same manner as that described in Comparative Example B.

An overcoat solution was prepared consisting of 8.0 g of diethylene glycol, 5.00 g of a 10.0% solution of Air Products Surfynol® 465, 5.00 g of 10 wt % solution of 2,3-dihydroxy-1,4-dioxane (DHD) obtained from Aldrich to obtain a final hardener concentration of 1.00 wt %, and additional deionized water for a total of 50.0 g. This solution was overcoated onto the above pigmented ink image. Very good waterfastness and excellent wet adhesion was observed in the 100% fill areas ($D_{max}$). Excellent waterfastness and wet adhesion properties was also observed at lower density patches, and with thin narrow lines (~1/32$^{nd}$ of an inch).

EXAMPLE 7

An ink was prepared and printed as in Comparataive Example A.

An overcoat solution was prepared consisting of 8.0 g of diethylene glycol, 5.00 g of a 10.0% solution of Air Products Surfynol® 465, 25.00 g of 2.0 wt % solution of bis-(vinylsulfonyl)-methane ether (BVSME) to obtain a final concentration of 1.00 wt %, and additional deionized water for a total of 50.0 g. This solution was overcoated onto the above pigmented ink image. Very good waterfastness and wet adhesion was observed in the 100% fill areas ($D_{max}$). Excellent waterfastness and wet adhesion properties was also observed at lower density patches, and with thin narrow lines (~1/32$^{nd}$ of an inch).

EXAMPLE 8

An ink was prepared and printed as in Comparative Example B.

An overcoat solution was prepared consisting of 8.0 g of diethylene glycol, 5.00 g of a 10.0% solution of Air Products Surfynol® 465, 25.00 g of 2.0 wt % solution of BVSME to obtain a final concentration of 1.00 wt %, and additional deionized water for a total of 50.0 g. This solution was overcoated onto the above pigmented ink image. Excellent waterfastness and wet adhesion was observed in the 100% fill areas ($D_{max}$). Excellent waterfastness and wet adhesion properties was also observed at lower density patches, and with thin narrow lines (~1/32$^{nd}$ of an inch).

EXAMPLE 9

An ink was prepared and printed as in Comparative Example A.

An overcoat solution was prepared consisting of 8.0 g of diethylene glycol, 5.00 g of a 10.0% solution of Air Products Surfynol® 465, 27.78 g of 1.80 wt % solution of bis-(vinylsulfonyl)-methane (BVSM) to obtain a final concentration of 1.00 wt %, and additional deionized water for a total of 50.0 g. This solution was overcoated onto the above pigmented ink image. Excellent waterfastness and very good wet adhesion was observed in the 100% fill areas ($D_{max}$). Excellent waterfastness and wet adhesion properties was also observed at lower density patches, and with thin narrow lines (~1/32$^{nd}$ of an inch).

EXAMPLE 10

An ink was prepared and printed as in Comparative Example A.

An overcoat solution was prepared consisting of 8.0 g of diethylene glycol, 5.00 g of a 10.0% solution of Air Products Surfynol® 465, 27.78 g of 1.80 wt % solution of BVSM to obtain a final concentration of 1.00 wt %, and additional deionized water for a total of 50.0 g. This solution was overcoated onto the above pigmented ink image. Excellent waterfastness and wet adhesion was observed in the 100% fill areas ($D_{max}$). Excellent waterfastness and wet adhesion properties was also observed at lower density patches, and with thin narrow lines (~1/32$^{nd}$ of an inch).

Ink Characterization

The images printed from the examples and comparative examples were evaluated by measuring the optical densities in three area patches with maximum ink coverage, using an X-Rite Photographic Densitometer. The average of the three readings is reported. Waterfastness was determined by immersing samples of printed images in distilled water for 1 hour and then allowing the samples to dry for at least 12 hours. The optical density was measured before immersion in water and after immersion in water and drying. Waterfastness is determined as the per cent of retained optical density after immersion in water and drying. After the samples had been immersed in water for half an hour the samples were physically rubbed to ascertain if the pigmented ink image would rub off with pressure (wet adhesion). This was done on a $D_{max}$ patch (100% fill), at a mid-density point (0.50–1.0), and on narrow lines (~1/32$^{nd}$ of an inch). They were subjectively rated based on the following scale: excellent=no discernible difference in image density or appearance; very good=very slight density loss; good=moderate density loss; fair=image rubs off easily; and poor=image floats off surface of paper while immersed in water.

The invention has been described in detail with particular reference to certain preferred embodiments thereof, but it will be understood that variations and modifications can be effected within the spirit and scope of the invention.

PARTS LIST

| | |
|---|---|
| 10 | ink jet printing apparatus |
| 20 | computer |
| 30–34 | print heads |
| 40 | fluid reservoir |
| 41–44 | ink reservoirs |
| 70 | receiver transport |
| 80 | ink receiver |
| 90 | platen |
| 100 | ink drop |
| 105 | fluid drop |
| 110 | ink spot |
| 120 | fluid spot |
| 130 | printed image |
| 140 | treated image area |
| 150 | motor |
| 160 | shaft |
| 170 | roller |

What is claimed is:

1. An ink jet printing apparatus for producing an image, comprising:

a) an ink receiver coated with a layer of gelatin wherein the gelatin is cross-linkable with a hardening fluid;

b) at least one ink reservoir having ink therein for printing the image;

c) a first valveless print head disposed adjacent the ink receiver and the at least one ink reservoir for depositing spots of ink on the ink receiver;

d) a fluid reservoir having a hardening fluid therein which is cross-linkable with the gelatin; and e) a second valveless print head disposed adjacent to the ink receiver and connected to the fluid reservoir for receiving the hardening fluid therefrom for depositing the hardening fluid over the ink spots on the ink receiver without clogging the print head, thereby improving the stability and durability of the image as determined by improved wet adhesion due to cross-

TABLE 1

Examples 1–12 are summarized in the following table.

| Example | Receiver | Pigment | Hardener Type | Hardener Amount (wt %) | Density Before | % Retained Density | Wet Adhesion ($D_{max}$ Patch) | Wet Adhesion (Lines + $D_{min}$) |
|---|---|---|---|---|---|---|---|---|
| Comp. A | gelatin | cyan | None | None | 1.83 | 71 | Fair | Poor |
| Comp. B | gelatin | p.r. 122 | None | None | 2.05 | 3 | Poor | Poor |
| 1 | gelatin | cyan | FA | 1.50 | 1.79 | 96 | Excellent | Excellent |
| 2 | gelatin | p.r. 122 | FA | 1.50 | 2.10 | 91 | Excellent | Excellent |
| 3 | gelatin | cyan | Glyoxal | 1.0 | 1.89 | 82 | Good | Excellent |
| 4 | gelatin | p.r. 122 | Glyoxal | 1.0 | 2.03 | 101 | Very Good | Excellent |
| 5 | gelatin | cyan | DHD | 1.0 | 1.85 | 89 | Good | Excellent |
| 6 | gelatin | p.r. 122 | DHD | 1.0 | 2.10 | 83 | Excellent | Excellent |
| 7 | gelatin | cyan | BVSME | 1.0 | 1.82 | 89 | Very Good | Excellent |
| 8 | gelatin | p.r. 122 | BVSME | 1.0 | 2.01 | 97 | Excellent | Excellent |
| 9 | gelatin | cyan | BVSM | 1.0 | 1.83 | 97 | Very Good | Excellent |
| 10 | gelatin | p.r. 122 | BVSM | 1.0 | 1.95 | 102 | Excellent | Excellent |

p.r. = pigment red
BVSME = bis-(vinylsulfonyl)-methane ether
DHD = 2,3-dihydroxy-1,4-dioxane
BVSM = bis-(vinylsulfonyl)-methane
FA = formaldehyde The results indicate that significant enhancement of waterfastness and wet adhesion properties of images printed on gelatin, can be achieved when an overcoat solution containing hardeners such as aldehydes, blocked aldehydesactive olefins and blocked active olefins are overcoated onto the pigmented ink image.

linking of the hardening fluid with the gelatin, while improving the reliability of the apparatus.

2. The inkjet printing apparatus of claim 1 wherein the ink spots are deposited on the ink receiver in response to a digital input.

3. The ink jet printing apparatus of claim 1 wherein the print heads are drop-on-demand ink jet printers.

4. The ink jet printing apparatus of claim 1 wherein the print heads are continuous ink jet printers.

5. The ink jet printing apparatus of claim 1 wherein when ink spots are produced the hardening fluid is deposited on the receiver in the same printing pass.

6. The ink jet printing apparatus of claim 1 wherein the ink comprise color pigments.

7. The ink jet printing apparatus of claim 1 wherein the ink comprise dyes.

8. The ink jet printing apparatus of claim 1 wherein the fluid comprises a compound having a blocked aldehyde functional group.

9. The ink jet printing apparatus of claim 1 wherein the fluid comprises a compound having aldehyde functional groups.

10. The ink jet printing apparatus of claim 1 wherein the fluid comprises a compound having active olefinic functional groups.

11. An ink jet printing apparatus for reproducing an image on an ink receiver in response to an input digital image, comprising:

a) a coating of gelatin on the ink receiver wherein the gelatin is cross-linkable with a hardening fluid;

b) a computer adapted to receive the input digital image;

c) at least one ink reservoir having ink therein for printing the image on the gelatin coating;

d) a first valveless print head disposed adjacent to the ink receiver and the at least one ink reservoir for producing spots of the ink on the ink receiver in response to the computer;

e) a fluid reservoir having a hardening fluid therein which is cross-linkable with the coating of gelatin; and f) a second valveless print head disposed adjacent to the ink receiver and connected to the fluid reservoir for receiving the cross-linkable fluid therefrom, the second valveless print head in response to the computer, depositing the fluid over the ink spots deposited on the ink receiver without clogging the second print head, thereby improving the image stability and durability of the image as determined by improved wet adhesion by cross-linking of the hardening fluid with the gelatin, while improving the reliability of the image apparatus.

12. The apparatus of claim 11 wherein the at least one ink reservoir contains color ink.

13. A method of producing an image on an ink receiver using the apparatus of claim 1 or 11, comprising the steps of:

a) ejecting ink from the ink reservoir through the first print head and disposing said ink onto the ink receiver; and b) ejecting fluid from the fluid reservoir through the second print head onto the ink spots disposed on the ink receiver.

14. The ink jet printing apparatus of claim 1, wherein the hardening fluid is a solution containing a hardener selected from the group consisting of aldehydes, blocked aldehydes and blocked active olefins.

15. The ink jet printing apparatus of claim 11, wherein the hardening fluid is a solution containing a hardener selected from the group consisting of aldehydes, blocked aldehydes and blocked active olefins.

16. The ink jet printing apparatus of claim 1, wherein the fluid is a solution containing a hardener selected from the group consisting of glyoxal, DHD and formaldehyde in concentrations ranging from about 0.10 to 5.0 wt %.

17. The ink jet printing apparatus of claim 11, wherein the fluid is solution containing a hardener selected from the group consisting of glyoxal, DHD and formaldehyde in concentrations ranging from about 0.10 to 5.0 wt %.

* * * * *